United States Patent
Harper et al.

(10) Patent No.: US 12,489,524 B2
(45) Date of Patent: Dec. 2, 2025

(54) DATA COMMUNICATION CONNECTOR

(71) Applicant: Microsoft Technology Licensing, LLC, Redmond, WA (US)

(72) Inventors: Marc Harper, Snohomish, WA (US); Apoorva Sharma, Sammamish, WA (US); Daniel Dhondt, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 17/957,008

(22) Filed: Sep. 30, 2022

(65) Prior Publication Data

US 2024/0113774 A1  Apr. 4, 2024

(51) Int. Cl.
| | |
|---|---|
| *H04B 7/24* | (2006.01) |
| *H01Q 1/22* | (2006.01) |
| *H01Q 21/08* | (2006.01) |
| *H04B 1/38* | (2015.01) |
| *H01R 13/62* | (2006.01) |

(Continued)

(52) U.S. Cl.
CPC ............ *H04B 7/24* (2013.01); *H01Q 1/2258* (2013.01); *H01Q 21/08* (2013.01); *H04B 1/38* (2013.01); *H01R 13/6205* (2013.01); *H01R 13/6691* (2013.01); *H01R 43/26* (2013.01)

(58) Field of Classification Search
CPC .......... H04B 7/24; H01Q 1/2258; H01Q 1/38; H01Q 21/08; H01R 13/6205; H01R 13/6691; H01R 43/26
See application file for complete search history.

(56) References Cited

U.S. PATENT DOCUMENTS 8,090,402 B1 * 1/2012 Fujisaki ............ H04M 1/72415
  455/410
9,516,457 B2 * 12/2016 Sudak .................. G06F 1/1698
(Continued)

OTHER PUBLICATIONS

"International Search Report and Written Opinion issued in PCT Application No. PCT/US23/027961", Mailed Date: Oct. 24, 2023, 16 Pages.

(Continued)

*Primary Examiner* — Junpeng Chen
(74) *Attorney, Agent, or Firm* — Holzer Patel Drennan

(57) ABSTRACT

A first data connector for communicating data with a second data connector includes a data communication interface including adjacent radiofrequency antenna elements, wherein a plurality of the adjacent radiofrequency antenna elements forms a radiofrequency data antenna array and another radiofrequency antenna element of the adjacent radiofrequency antenna elements forms a radiofrequency control channel antenna element, each radiofrequency antenna element of the radiofrequency data antenna array being configured to communicate a subchannel signal of the data to a corresponding radiofrequency data antenna element of a data communication interface of the second data connector bidirectionally. The radiofrequency control channel antenna element is configured to manage data communications through the radiofrequency data antenna array. An attachment interface is positioned on the first data connector and configured to removably attach the first data connector to the second data connector.

24 Claims, 7 Drawing Sheets

(51) Int. Cl.
*H01R 13/66* (2006.01)
*H01R 43/26* (2006.01)

(56) References Cited

U.S. PATENT DOCUMENTS

| | | | |
|---|---|---|---|
| 9,888,516 B1* | 2/2018 | Kersjes | H04W 76/15 |
| 2007/0024506 A1* | 2/2007 | Hardacker | H01Q 25/00 |
| | | | 343/786 |
| 2008/0304468 A1* | 12/2008 | Sun | H04B 7/0417 |
| | | | 370/345 |
| 2010/0091915 A1* | 4/2010 | Xu | H04B 7/068 |
| | | | 375/343 |
| 2010/0246496 A1* | 9/2010 | Yurugi | H04B 7/0874 |
| | | | 370/328 |
| 2013/0157477 A1 | 6/2013 | Mccormack | |
| 2014/0055945 A1 | 2/2014 | Sudak | |
| 2014/0226455 A1* | 8/2014 | Schumacher | H01R 13/6461 |
| | | | 370/201 |
| 2015/0085903 A1 | 3/2015 | Gundel et al. | |
| 2015/0349847 A1 | 12/2015 | Hassan-Ali et al. | |
| 2016/0094090 A1* | 3/2016 | Abramov | H01Q 1/243 |
| | | | 307/104 |
| 2016/0149315 A1 | 5/2016 | Elsherbini et al. | |
| 2017/0262034 A1* | 9/2017 | Isaac | G06F 13/4282 |
| 2017/0301997 A1 | 10/2017 | Kosaka | |
| 2017/0325328 A1 | 11/2017 | Isaac et al. | |
| 2018/0145400 A1 | 5/2018 | Gabriel et al. | |
| 2021/0013632 A1* | 1/2021 | Lee | H01Q 21/065 |

OTHER PUBLICATIONS

International Preliminary Report on Patentability received for PCT Application No. PCT/US23/027961, Apr. 10, 2025, 12 pages.
Fakharzadeh, Mohammad, "A compact 4 by 1 patch array antenna-in-package for 60 GHz applications", In Proceedings of the IEEE International Symposium on Antennas and Propagation, Jul. 8, 2012, 2 Pages.
Govindarajulu, et al., "A 60 GHz Millimeter-Wave Antenna Array for 3D Antenna-in-Package Applications", In Journal of IEEE Access, vol. 9, Oct. 18, 2021, pp. 143307-143314.
Wollenschläger, et al., "A compact dual-polarized wideband patch antenna array for the unlicensed 60 GHz band", In Proceedings of the 5th European Conference on Antennas and Propagation (EUCAP), Apr. 11, 2011, pp. 1873-1877.
Yang, et al., "A Compact High-Performance Patch Antenna Array for 60-GHz Applications", In Journal of IEEE Antennas and Wireless Propagation Letters ( vol. 15), Jun. 9, 2015, pp. 313-316.

\* cited by examiner

700

Removably attach a magnetized attachment interface positioned at the first data connector to the second data connector and aligning a data communication interface of the first data connector to face a data communication interface of the second data connector
702

Communicate the data between the data communication interface of the first data connector and the data communication interface of the second data connector
704

FIG. 7

DATA COMMUNICATION CONNECTOR

BACKGROUND

An electronic computing device typically includes input/output ports, antennas, a display, a power supply circuitry, and other assorted circuitry. Some such ports are configured to supply power and/or data via a wired electrical connection to the electronic computing device. For example, in one example, a hub may be electrically connected to the electronic computing device via a cable and wired electrical connections to supply both power and data to the electronic computing device.

SUMMARY

The described technology provides a first data connector for communicating data with a second data connector. The first data connector includes a data communication interface including adjacent radiofrequency (RF) antenna elements, wherein a plurality of the adjacent radiofrequency antenna elements forms a radiofrequency data antenna array and another radiofrequency antenna element of the adjacent radiofrequency antenna elements forms a radiofrequency control channel antenna element, each radiofrequency antenna element of the radiofrequency data antenna array being configured to communicate a subchannel signal of the data to a corresponding radiofrequency data antenna element of a data communication interface of the second data connector bidirectionally. The radiofrequency control channel antenna element is configured to manage data communications through the radiofrequency data antenna array. An attachment interface is positioned on the first data connector and configured to removably attach the first data connector to the second data connector.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 7 illustrates example operations using an RF data connector interface with an electronic computing device.

DETAILED DESCRIPTIONS

Wired electrical connections with an electrical computing device can introduce industrial design and RF performance issues. For example, some implementations of wired electrical connections require a strong degree of physical/electrical contact between data channel leads of the connector and data channel leads of the computing device. Such physical/electrical contact can become degraded over time, thereby degrading the speed at which the connector interface is able to transfer data.

Another consideration is degradation in performance of various antennas in the electrical computing device caused by RF noise generated by the wired electrical connections of the connector interface, which is generally referred to as desense. For example, with Thunderbolt 4 ports operating at 40 Gb/s and 120 W and other connector ports operating 5 Gb/s and 100 W, the data connection ports generate RF noise at 600 MHz-6 GHz. As such, noise generated at these bandwidths can degrade the performance of other antennas in the electronic computing device, such as 5G wireless network antennas, Wi-Fi antennas, Bluetooth antennas, etc. However, in the described technology, the data communication bandwidth of the wireless data connection can be configured at about 60 GHz or some other bandwidth that is sufficiently separated from the operational bandwidth of the various antennas in the computing device to minimize or avoid the desensing of other antennas in the device.

Yet other considerations with wired connectors include the industrial design concerns (e.g., size and components costs) of the wired interfaces on both sides of the port (e.g., the computing device and the connector) and the risk of damaging the physical contacts and connector housing as the connector is repeatedly removed from the port over time.

By reducing or eliminating the need for physical contact for data communications and/or for a power supply, many such considerations may be resolved. In some implementations, wired data connections are replaced with wireless RF communication interfaces between the computing device and the connector and may or may not include a power supply connection. In other implementations, both the wired data connection and the wired power supply connection can be replaced with wireless interfaces, such as an RF interface for data communications and an inductive charging connection for the power supply. These implementations provide technical benefits to the technology by providing a fast data connection without the significant risks of desense and connector damage/poor connection while addressing industrial design preferences (e.g., size and cost). It should be understood that a self-aligning connector that does not require a user to accurately insert a physical data connector into a physical slot (e.g., a USB port) of a computing device provides a better user experience than those physical data connections.

Figure 1:
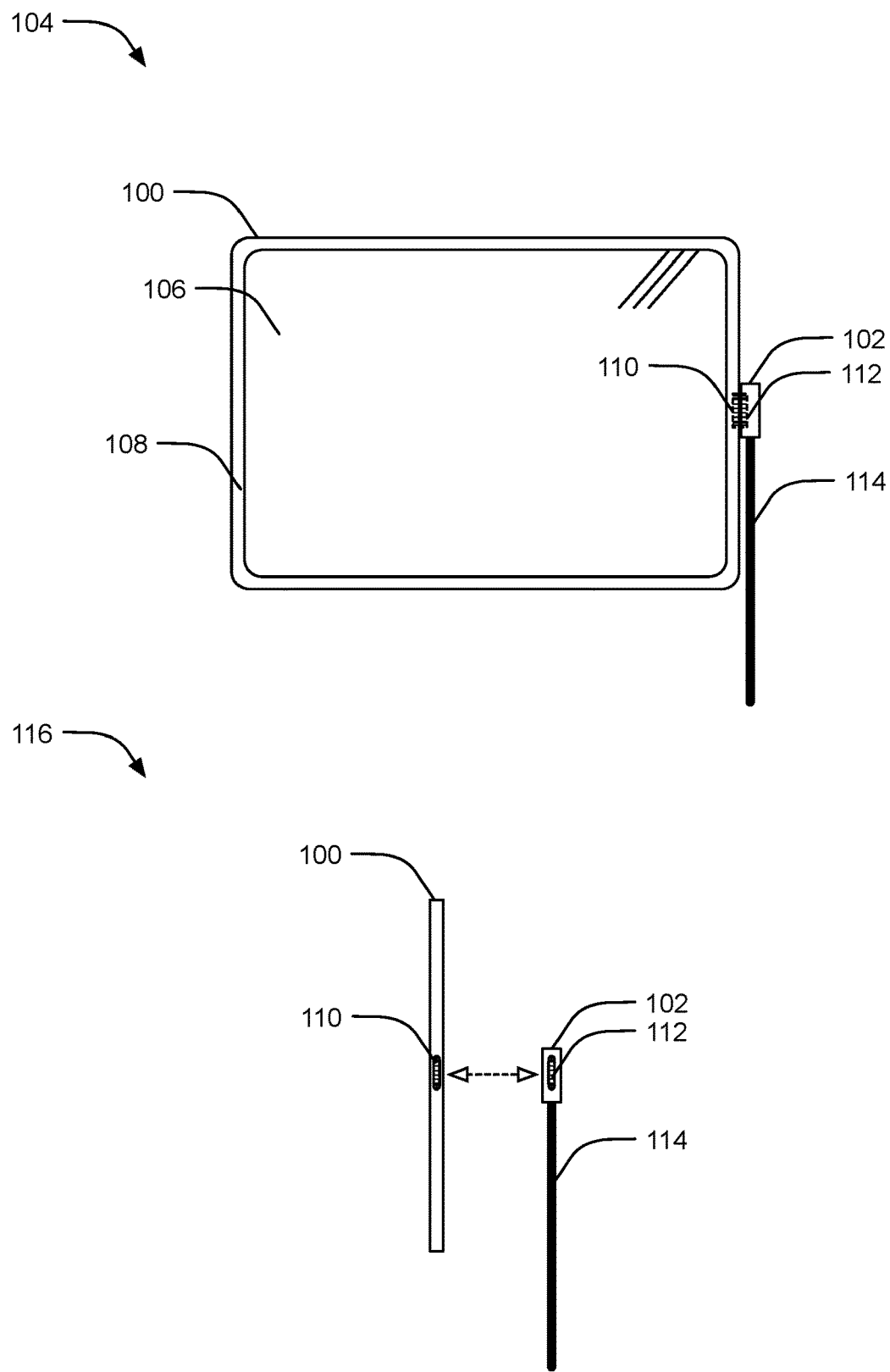
FIG. 1 illustrates an example electronic computing device coupled to a radiofrequency (RF) data connector.

FIG. 1 illustrates an example electronic computing device 100 coupled to an RF data connector 102. In a plan view 104, the electronic computing device 100 includes a display 106, a bezel 108 surrounding the display 106, and a connector interface 110 in an RF data connector port. The RF data connector 102 includes a connector interface 112 and a cable 114, which can be connected elsewhere to power and/or data sources. When the RF data connector 102 is coupled to the connector interface 110, the electronic computing device 100 can receive power from a power source and/or communicate with the data source. In some implementations, the electronic computing device 100 can also provide power to other peripherals via the connector interface 110 and the connector interface 112. It should be understood that some implementations may not include a power connection or a data connection.

A side view 116 depicts the connector interface 110 and the connector interface 112 as disconnected and facing out of the page (toward the reader). The dashed arrow indicates the intended alignment of the connector interface 110 and the connector interface 112 when rotated and brought together to provide a power and/or data connection. The connector interface 112 and the connector interface 110 include magnetics to magnetically and removably attach the connector interface 112 to the connector interface 110 and to assist in aligning the data and/or power elements of each side of the interface with each other. Other removable attachment elements may be employed, including frictional fit surfaces, clips, screws, etc.

In some implementations, the connector interface 112 and the connector interface 110 may provide a data-only interface, a power-only interface, or a data-and-power interface. Furthermore, while FIG. 1 illustrates the connection positioned on an edge of the device, other implementations may be positioned on other surfaces of the device, such as a front or back surface.

Figure 2:
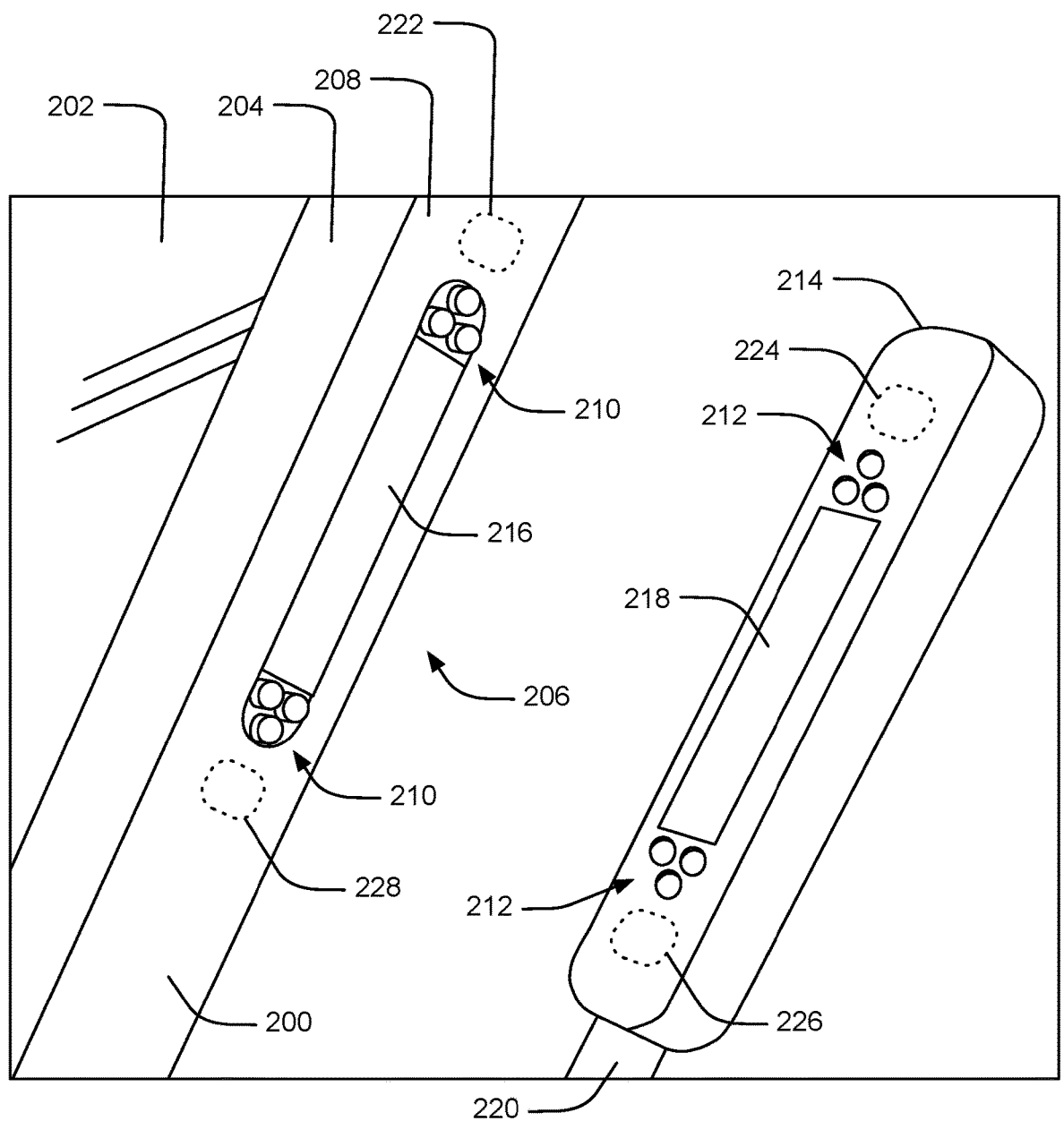
FIG. 2 illustrates power and data connector interfaces in an example RF data connection with an electronic computing device.

FIG. 2 illustrates power and data connector interfaces in an example RF data connection with an electronic computing device 200. The electronic computing device 200 includes a display 202, a bezel 204 surrounding the display 202, and a connector port 206 positioned on the side 208 of the electronic computing device 200. It should be understood that the connector port 206 can be positioned on any edge or surface of the electronic computing device 200. The connector port 206 includes six power connector pins or pads (three pins on each end of the connector port 206). One or more of the power connector pins 210 may be spring-loaded or otherwise biased to provide sufficient force against corresponding power connector pins 212 of a connector 214. In the illustrated implementation, power may be supplied through the power connector pins 210 and the corresponding power connector pins 212 when they are in contact.

The connector port 206 also includes a data connector interface 216 in the electronic computing device 200. In FIG. 2, one or more antennas (not shown) are positioned behind an RF transparent window in the data connector interface 216. It should be understood that the RF transparent windows may not perfectly pass all RF signals and, therefore, may be considered merely RF translucent. Nevertheless, as used herein, the term "RF transparent" indicates a window capable of passing some or all of the RF signals of interest, with or without substantial attenuation.

The connector 214 includes the corresponding power connector pins 212, a data connector interface 218, and a cable 220, which can be connected elsewhere to power and/or data sources. When connected to the electronic computing device 200, the connector 214 is magnetically aligned and secured to the connector port 206 of the electronic computing device 200 such that the power connector pins 210 of the connector port 206 and the corresponding power connector pins 212 of the connector 214 are aligned to enable power to be supplied between the pins. One or more of the power connector pins 212 may be spring-loaded or otherwise biased to provide sufficient force against corresponding power connector pins 210 of electronic computing device 200. Likewise, the data connector interface 216 of the electronic computing device 200 and the data connector interface 218 of the connector 214 are aligned to allow RF communications between the data connector interfaces.

As illustrated, the connector port 206 and the connector 214 are connected in close proximity to each other. The power connector pins 210 and corresponding power connector pins 212 are in physical contact when the connector 214 is connected to the connector port 206. As such, the data connector interface 216 and the data connector interface 218 are also positioned in close proximity.

In other implementations, particularly in designs for which no physical contact is required for power transfer (e.g., inductive charging), the data connector interface 216 and the data connector interface 218 can be separated by a nontrivial distance (e.g., up to about six feet in separation, although it could be farther with more gain), particularly if the RF transparent windows provide some lens capabilities. One factor in this capability of providing data across a nontrivial separation distance is that the data antenna array 302 provides a level of gain such that the gain can account for the signal loss across the nontrivial distance without negatively impacting the data transfer speed.

In some implementations, the connector 214 and the connector port 206 include magnetics (e.g., magnet 222, magnet 224, magnet 226, and magnet 228) to magnetically and removably attach the connector interface 112 to the connector interface 110 and to assist in aligning the data and/or power elements of each side of the interface with each other. In some implementations, the connector 214 and the connector port 206 may provide a data-only interface, a power-only interface, or a data-and-power interface.

Figure 3:
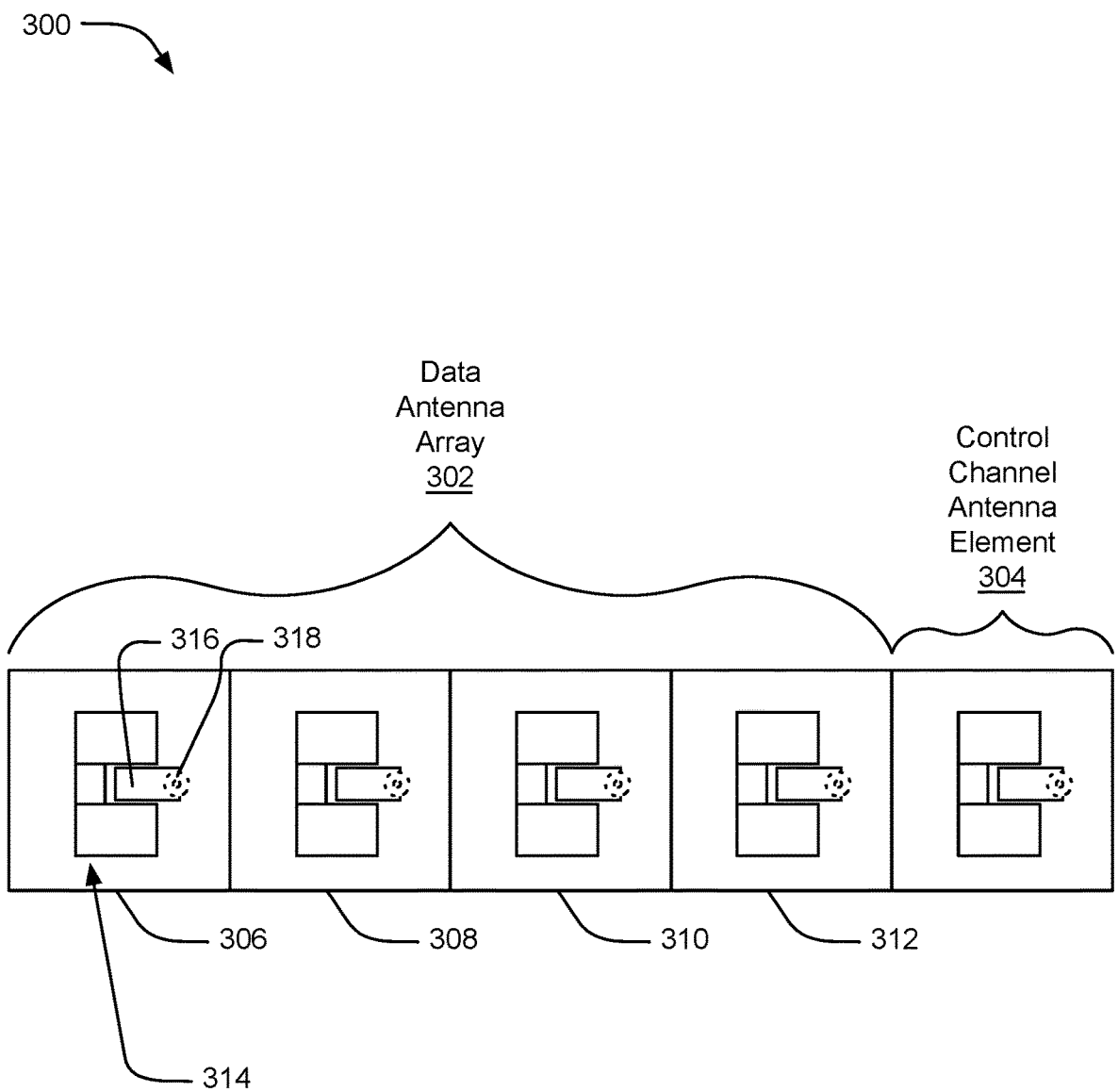
FIG. 3 illustrates an antenna array of an example RF data connector interface.

FIG. 3 illustrates an antenna array 300 of an example RF data connector interface. An instance of the antenna array 300 is shown in FIG. 3 can be positioned on both the electronic computing device and the connector. The antenna array 300 includes a data antenna array 302 and a control channel antenna element 304. The data antenna array 302 includes four data antenna elements (e.g., data antenna element 306, data antenna element 308, data antenna element 310, and data antenna element 312), although the number of data antenna elements can be adjusted to provide a predefined data transfer speed operating in an RF bandwidth that is sufficiently separated from the RF bandwidths of other RF antennas in the electronic computing device to reduce or eliminate degrading the performance of those other RF antennas.

In some implementations, additional data antenna elements can be added to the design of the antenna array 302 to achieve faster data transfer speeds without substantially increasing the frequency of RF noise radiation emitted from the connector interface. For example, in one implementation, the illustrated antenna array 300 operates at 20 Gb/s with the four data antenna elements (plus the control channel antenna element 304). To achieve 40 Gb/s of data transfer speed, the illustrated design can be changed to include eight data antenna elements (plus the control channel antenna element 304) without changing the operational frequency of the connector, thereby scaling the data transfer speeds without impacting the performance of other antennas in the computing device with RF noise from the connector.

Each data antenna element is configured to communicate a subchannel of data. On the transmitting side, the data channel is split into four separate subchannels, wherein the data of each subchannel is transmitted from one of the data antenna elements to a corresponding data antenna element on the receiving side of the interface. On the receiving side, the four separate subchannels are re-aggregated (or merged) into a data channel for consumption by the receiver (e.g., the electronic computing device or peripherals connected to a hub via the cable). Approaches the merging and splitting may involve multiplexing/demultiplexing and other techniques. By using supporting multiple subchannels with multiple data antenna elements, the connector device is able to achieve a level of gain from the antenna array, which can provide technical benefits of using very small data antenna elements and maintaining high data transfer speeds.

The antenna array 300 also includes the control channel antenna element 304, which synchronizes the data communications between the transmitter and receiver across the four data antenna elements. In some implementations, the antenna array 300 can support separate (e.g., independent) data channels (e.g., one data channel through the data antenna element 306 and the data antenna element 308 and another data channel through the data antenna element 310 and the data antenna element 312). In such implementations, each data channel may be synchronized by its own control channel antenna element. In other implementations, alternative synchronization techniques may be employed, such as dedicated data transfer windows, in-band synchronization information, etc. A separate control channel can provide at least a technical benefit of synchronizing the subchannel data transfers without negatively impacting data transfer rates with the overhead of dedicated data transfer windows or consuming data subchannel bandwidth with communication synchronization signals Each antenna element illustrated in FIG. 3 includes a patch antenna (e.g., a patch antenna 314), a feed trace (e.g., a feed trace 316), and a via (e.g., a via 318). Other antenna configurations may be used, including slot antennas, dielectrically resonator antennas, a loop antenna, and other antennas. The feed trace connects through the via to a transceiver positioned behind the surface of the antenna element to transmit and receive the signals through the antenna.

To reduce or eliminate interference between individual antenna elements (whether data antenna elements or control channel antenna elements), the RF fields of adjacent antenna elements are differently polarized as compared to each other. For example, the RF field of the data antenna element 306 is polarized vertically, the RF field of the data antenna element 308 is polarized horizontally, the RF field of the data antenna element 310 is polarized vertically, the RF field of the data antenna element 312 is polarized horizontally, and the RF field of the control channel antenna element 304 is polarized vertically. Other polarization diversity combinations may be employed within the scope of the described technology. Nevertheless, polarization diversity is one example of reducing or eliminating RF interference between individual antenna elements, although other configurations may also be used in other implementations (e.g., RF isolators between individual antenna elements, some metallic shielding structures, and decoupling networks).

Figure 4:
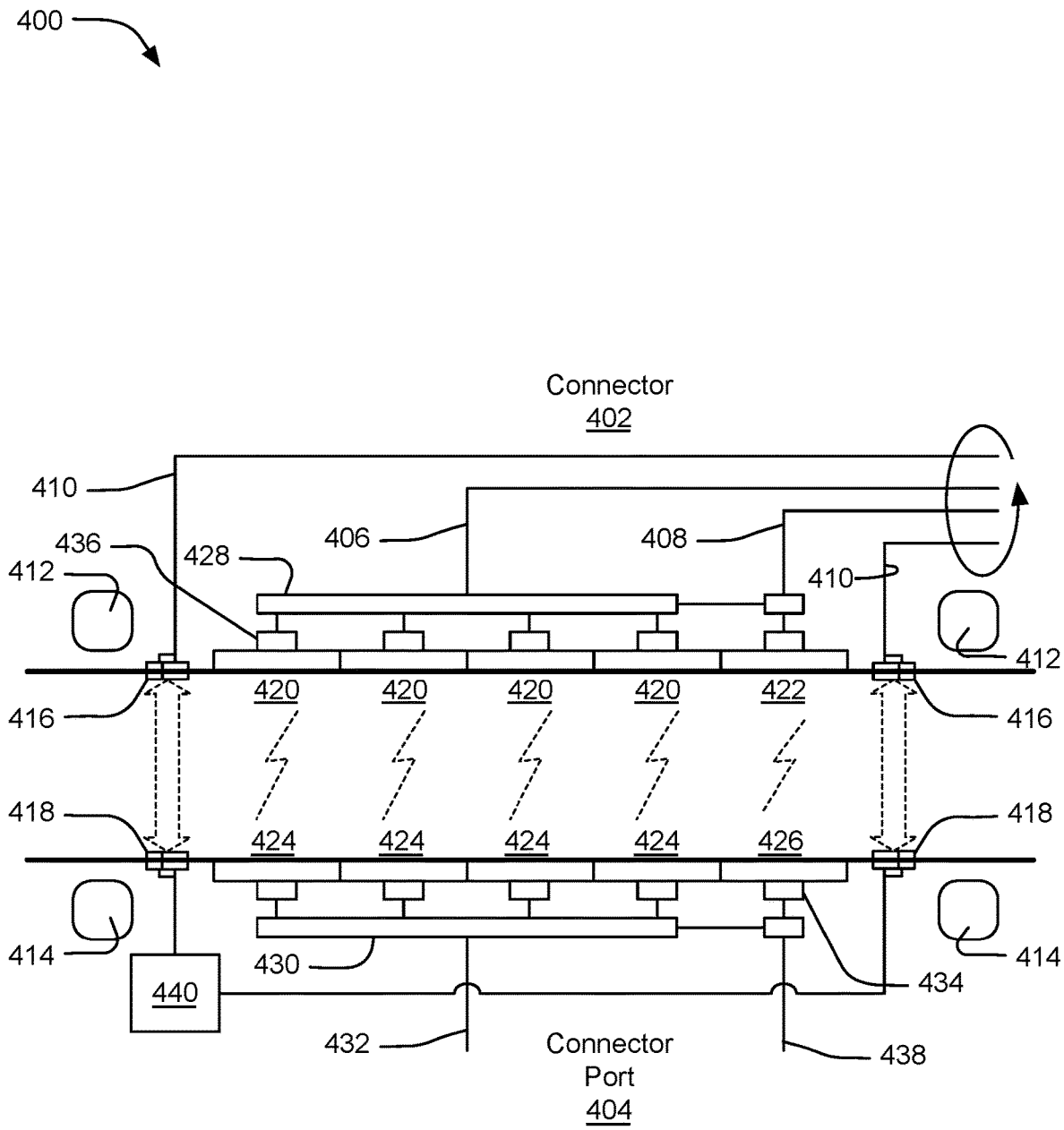
FIG. 4 illustrates schematics of an interface including an example RF data connector and an RF data connector port on an electronic computing device.

FIG. 4 illustrates schematics of an interface 400 including an example RF data connector 402 and an example RF data connector port 404 on an electronic computing device. Both the RF data connector 402 and the RF data connector port 404 are referred to as "RF data connectors."

The RF data connector 402 (similar to RF data connector 102) includes a cable (not shown) through which a data communication line 406, a communication control line 408, and power supply lines 410 are threaded to connect to other devices, such as a hub or other peripheral devices. The RF data connector 402 includes attachment magnets 412 configured to removably attach the RF data connector 402 to attachment magnets 414 of the RF data connector port 404. The RF data connector 402 includes power connector pins 416 configured to electrically connect to power connector pins 418 of the RF data connector port 404. The dashed arrows between the corresponding power connector pins indicate that the power connector pins are in contact when the RF data connector 402 is attached to the RF data connector port 404.

The RF data connector 402 includes an RF data communication interface including adjacent RF antenna elements. Four of the adjacent RF antenna elements 420 of the RF data connector 402 form an RF data antenna array, and another RF antenna element 422 forms an RF control channel antenna element that manages the data communications through an aggregator 428. In the illustrated implementation, when the RF data connector 402 is attached to the RF data connector port 404, these elements align with corresponding adjacent RF antenna elements of the RF data connector port 404, such that the four adjacent RF antenna elements 420 of the RF data connector 402 align (e.g., the subchannels align) with four adjacent RF antenna elements 424 (forming an RF data antenna array) of the RF data connector port 404 and the RF antenna element 422 (an RF control channel antenna element) of the RF data connector 402 aligns with an RF antenna element 426 (an RF control channel antenna element) of the RF data connector port 404. The dashed "lightning bolts" between the corresponding RF antenna elements indicate that the RF antenna elements are in wireless communication when the RF data connector 402 is attached to the RF data connector port 404. The RF control channel antenna element (RF antenna element 426) manages the data communications through an aggregator 430, synchronizing bidirectional communications in the subchannels between the RF data connector 402 and the RF data connector port 404. It should be understood that wireless communications may also be available between the corresponding RF antenna elements, even when the RF data connector 402 and the RF data connector port 404 are not attached and/or when power connector pins are not in contact, albeit potentially with decreased performance.

The term "adjacent" is used to describe the relative positioning of individual RF antenna elements as compared to other antenna elements. As such, while the "adjacent" RF antenna elements in FIG. 4, for example, are positioned immediately next to each other, without intervening space or structures separating them, other implementation of "adjacent" RF antenna elements may exhibit such intervening space or structures separating them. For example, two RF antenna elements separated by less (non-zero) distance than other RF antenna elements are considered adjacent, particularly if the separation is less than the smallest dimension of each RF antenna element. Likewise, the "adjacent" RF antenna elements may be separated by a small RF isolator or RF trap between them without becoming "non-adjacent." By providing some effective level of interference protection (e.g., polarization diversity, intervening RF isolators) between "adjacent" RF antenna elements, the dimensions of the connector can be smaller than in other implementations.

Each of the RF antenna elements of each RF data antenna array is configured to communicate subchannel RF signals of data between the RF data connector 402 and the RF data connector port 404. The aggregator 428 in the RF data connector 402 splits incoming data on the data communication line 406 into separate subchannels for communications across the RF data interface between the RF data connector 402 and the RF data connector port 404. Further, the aggregator 428 merges the separate subchannels of data received across the RF data interface between the RF data connector 402 and the RF data connector port 404 into a data channel for transmission along data communication line 406.

Likewise, the aggregator 430 in the RF data connector port 404 splits incoming data on the data communication line 432 into separate subchannels for communications across the RF data interface between the RF data connector 402 and the RF data connector port 404. Further, the aggregator 430 merges the separate subchannels of data received across the RF data interface between the RF data connector 402 and the RF data connector port 404 into a data channel for transmission along data communication line 432.

Each RF antenna element of the RF data connector 402 and the RF data connector port 404 are connected to a transceiver (e.g., transceiver 434 and transceiver 436). Furthermore, the RF control channel antenna element (RF antenna element 422) of the RF data connector 402 is connected to a communication control line 408, and the RF control channel antenna element (RF antenna element 426) of the RF data connector port 404 is connected to a communication control line 438, which carry control signals for synchronizing the data communicated through the subchannels of the RF data antenna arrays.

The power supply lines 410 of the RF data connector 402 supply power to (or potentially receive power from) a power supply subsystem 440 of the computing device, in which the RF data connector port 404 resides, via the power connector pins 416 of the RF data connector 402 and the power connector pins 418 of the RF data connector port 404.

Figure 5:
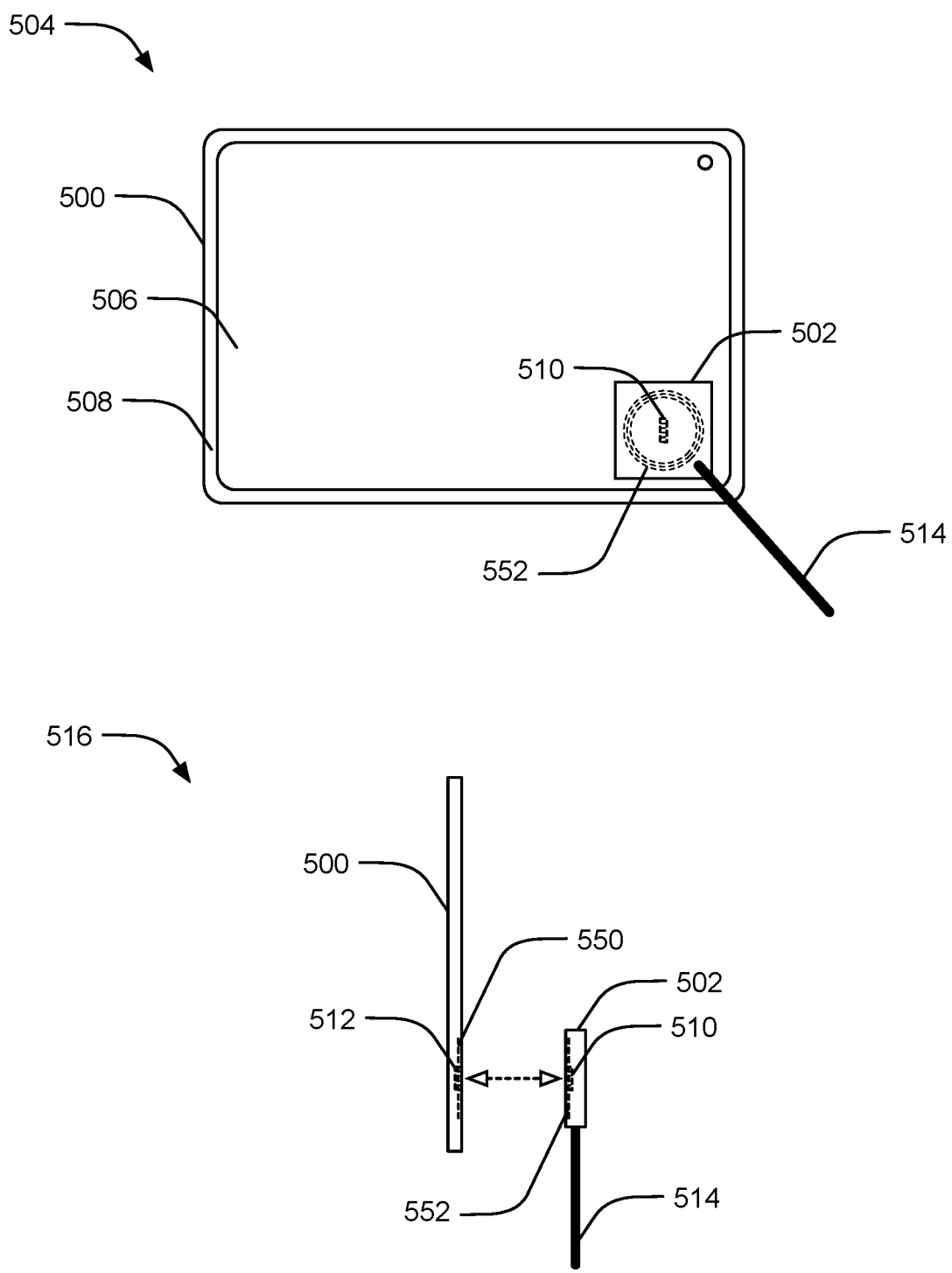
FIG. 5 illustrates an example electronic computing device coupled via another example RF data connector interface.

FIG. 5 illustrates an example electronic computing device 500 coupled via another example RF data connector 502. In a plan view 504, the electronic computing device 500 includes a display 506, a bezel 508 surrounding the display 506, an inductive charging coil 550 (obscured by the RF data connector 502 in the plan view 504 but visible in a side view 516), and a connector interface 512 (obscured by the RF data connector 502 in the plan view 504 but visible in a side view 516). The inductive charging coil 550 and the connector interface 512 are rendered in dashed lines to indicate that they are beneath the surface of the case of the electronic computing device 500.

The RF data connector 502 includes the connector interface 510, an inductive charging coil 552, and a cable 514, which can be connected elsewhere to power and/or data sources. The connector interface 510 and the inductive charging coil 552 are rendered in dashed lines to indicate that is are beneath the surface of the casing of the RF data connector 502. When the connector interface 510 of the RF data connector 502 is coupled to the connector interface 512 of the electronic computing device 500, the electronic computing device 500 can receive power from a power source and/or communicate with the data source through the two interfaces. In some implementations, the electronic computing device 500 can also provide power to other peripherals via the two interfaces. It should be understood that some implementations may not include a power connection or a data connection. Furthermore, other implementations on such a surface of the computing device may use other connection technologies, such as the power pins or pads described with respect to FIGS. 1 and 2. While the use of inductive charging can supply power to the electronic computing device 500 without requiring an opening in the computer casing for an electrical connection to power pins or pads, some implementations may benefit from the faster charging or higher power supply capabilities of an electrical connection.

A side view 516 depicts the connector interface 510 in the electronic computing device 500 and the connector interface 512 of the RF data connector 502 as disconnected but facing each other. The dashed arrow indicates the intended alignment of the connector interface 510 and the connector interface 512 when brought together to provide a power and/or data connection. The regions around the connector interface 512 and the RF data connector 502 include magnetics to magnetically and removably attach the RF data connector 502 to the region around the connector interface 512 and to assist in aligning the data and/or power elements of each side of the interface with each other.

In some implementations, the connector interface 512 and the connector interface 510 may provide a data-only interface, a power-only interface, or a data-and-power interface.

Figure 6:
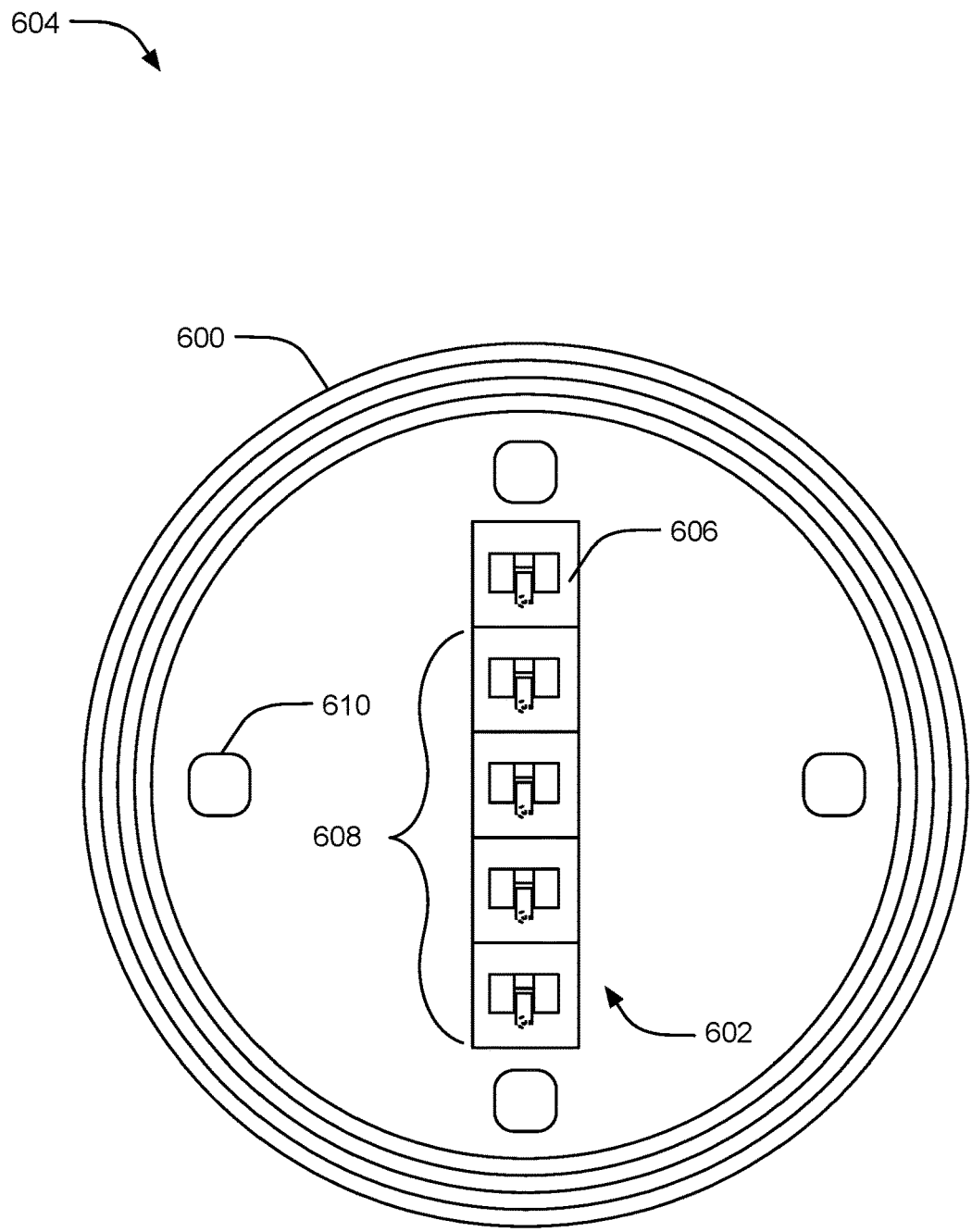
FIG. 6 illustrates an inductive power coil and an antenna array of an example RF data connector interface.

FIG. 6 illustrates an inductive power coil 600 and an antenna array 602 of an example RF data connector interface 604. The RF data connector interface 604 illustrates a configuration that can be used in either an electronic computing device or an RF data connector. The RF antenna element 606 forms the control channel antenna element, and the RF antenna elements 608 form the subchannel antenna elements of a data antenna array. Adjacent antenna elements of the RF antenna element 606 are differently polarized to reduce or eliminate RF interference between adjacent elements (e.g., vertically polarized, horizontally polarized, vertically polarized, . . . ).

The RF data connector interface 604 in FIG. 6 is shown with reference to removable attachment elements in the form of magnets (e.g., magnet 610). The magnets in FIG. 6 are shown to provide multi-dimensional alignment of the data communication and/or power interfaces of an external connector and the corresponding connector on the computing device. Other removable attachment elements may be employed, including frictional fit surfaces, clips, screws, etc.

FIG. 7 illustrates example operations 700 using an RF data connector interface with an electronic computing device. The operations 700 communicate data between a first data connector and a second data connector. An attachment operation 702 removably attaches an attachment interface positioned at the first data connector to the second data connector and aligns a data communication interface of the first data connector to face a data communication interface of the second data connector.

A communicating operation 704 communicates the data between the data communication interface of the first data connector and the data communication interface of the second data connector. The data communication interface of the first data connector includes adjacent radiofrequency antenna elements, wherein a plurality of the adjacent radiofrequency antenna elements forms a radiofrequency data antenna array. Another radiofrequency antenna element of the adjacent radiofrequency antenna elements forms a radiofrequency control channel antenna element. Each radiofrequency antenna element of the radiofrequency data antenna array is configured to communicate a subchannel of data to a corresponding radiofrequency data antenna element of the data communication interface of the second data connector bidirectionally.

In some implementations, the radiofrequency data antenna array can include more than one data channel, wherein the multiple data channels can operate independently of one another. In such a configuration, each additional channel may also be controlled by its own control channel antenna element.

Some implementations may comprise an article of manufacture. An article of manufacture may comprise a tangible storage medium to store logic. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

In some aspects, the techniques described herein relate to a first data connector for communicating data with a second data connector, the first data connector including: a data communication interface including adjacent radiofrequency antenna elements, wherein a plurality of the adjacent radiofrequency antenna elements forms a radiofrequency data antenna array and another radiofrequency antenna element of the adjacent radiofrequency antenna elements forms a radiofrequency control channel antenna element, each radiofrequency antenna element of the radiofrequency data antenna array being configured to communicate bidirectionally a subchannel signal of the data to a corresponding radiofrequency data antenna element of a data communication interface of the second data connector, the radiofrequency control channel antenna element being configured to manage data communications through the radiofrequency data antenna array; and an attachment interface positioned on the first data connector and configured to removably attach the first data connector to the second data connector.

In some aspects, the techniques described herein relate to a first data connector, wherein the first data connector is electrically connected as a port within a computing device and the adjacent radiofrequency antenna elements of the first data connector radiate radiofrequency signals that are within a radiofrequency bandwidth substantially outside of radiofrequency bandwidths of other radiofrequency antenna elements in the computing device.

In some aspects, the techniques described herein relate to a first data connector, wherein the first data connector is configured to be removably attachable to the second data connector, wherein the second data connector is electrically connected as a port within a computing device.

In some aspects, the techniques described herein relate to a first data connector, further including: a cable including data lines configured to communicate the data to and from the first data connector.

In some aspects, the techniques described herein relate to a first data connector, further including: a power supply interface configured to electrically connect to a power supply interface of the second data connector.

In some aspects, the techniques described herein relate to a first data connector, further including: a power supply interface configured to inductively couple to a power supply interface of the second data connector.

In some aspects, the techniques described herein relate to a first data connector, further including: a cable including power lines configured to supply power to the first data connector.

In some aspects, the techniques described herein relate to a first data connector, further including: transceivers, each transceiver being coupled to one of the adjacent radiofrequency antenna elements.

In some aspects, the techniques described herein relate to a first data connector, further including: a subchannel signal aggregator configured to merge subchannel signals of the data into an aggregated channel.

In some aspects, the techniques described herein relate to a first data connector, wherein radiation emitted from one of the adjacent radiofrequency antenna elements is polarized differently compared to radiation emitted from an adjacent one of the adjacent radiofrequency antenna elements.

In some aspects, the techniques described herein relate to a method of communicating data between a first data connector and a second data connector, the method including: removably attaching an attachment interface positioned at the first data connector to the second data connector and aligning a data communication interface of the first data connector to face a data communication interface of the second data connector; and communicating the data between the data communication interface of the first data connector and the data communication interface of the second data connector, wherein the data communication interface of the first data connector includes adjacent radiofrequency antenna elements, wherein a plurality of the adjacent radiofrequency antenna elements forms a radiofrequency data antenna array, each radiofrequency antenna element of the radiofrequency data antenna array being configured to communicate bidirectionally a subchannel of data to a corresponding radiofrequency data antenna element of the data communication interface of the second data connector.

In some aspects, the techniques described herein relate to a method, wherein the first data connector is electrically connected as a port within a computing device and the adjacent radiofrequency antenna elements of the first data connector radiate radiofrequency signals that are within a radiofrequency bandwidth substantially outside of radiofrequency bandwidths of second radiofrequency antenna elements in the computing device.

In some aspects, the techniques described herein relate to a method, wherein the first data connector is configured to be attachable to the second data connector, wherein the second data connector is electrically connected as a port within a computing device.

In some aspects, the techniques described herein relate to a method, wherein

In some aspects, the techniques described herein relate to data lines are connected by a cable and configured to communicate the data to and from the first data connector.

In some aspects, the techniques described herein relate to a method, wherein

In some aspects, the techniques described herein relate to a power supply interface is configured to electrically connect to a power supply interface of the second data connector.

In some aspects, the techniques described herein relate to a method, wherein a power supply interface is configured to inductively couple to a power supply interface of the second data connector.

In some aspects, the techniques described herein relate to a method, wherein power lines are connected by a cable to supply power to a power supply interface of the first data connector.

In some aspects, the techniques described herein relate to a method, wherein each adjacent radiofrequency antenna element is connected to a transceiver.

In some aspects, the techniques described herein relate to a method, wherein

In some aspects, the techniques described herein relate to subchannel signals of the data into an aggregated channel are configured to be merged by a subchannel signal aggregator.

In some aspects, the techniques described herein relate to a method, wherein radiation emitted from one of the adjacent radiofrequency antenna elements is polarized differently compared to radiation emitted from an adjacent one of the adjacent radiofrequency antenna elements.

In some aspects, the techniques described herein relate to a system of communicating data between a first data connector and a second data connector, the system including: means for removably attaching an attachment interface positioned at the first data connector to the second data connector and means for aligning a data communication interface of the first data connector to face a data communication interface of the second data connector; and communicating the data between the data communication interface of the first data connector and the data communication interface of the second data connector, wherein the data communication interface of the first data connector includes adjacent radiofrequency antenna elements, wherein a plurality of the adjacent radiofrequency antenna elements forms a radiofrequency data antenna array, each radiofrequency antenna element of the radiofrequency data antenna array being configured to communicate bidirectionally a subchannel of data to a corresponding radiofrequency data antenna element of the data communication interface of the second data connector.

In some aspects, the techniques described herein relate to a system, wherein the first data connector is electrically connected as a port within a computing device and the adjacent radiofrequency antenna elements of the first data connector radiate radiofrequency signals that are within a radiofrequency bandwidth substantially outside of radiofrequency bandwidths of second radiofrequency antenna elements in the computing device.

In some aspects, the techniques described herein relate to a system, wherein the first data connector is configured to be attachable to the second data connector, wherein the second data connector is electrically connected as a port within a computing device.

In some aspects, the techniques described herein relate to a system, wherein data lines are connected by a cable and configured to communicate the data to and from the first data connector.

In some aspects, the techniques described herein relate to a system, wherein a power supply interface is configured to electrically connect to a power supply interface of the second data connector.

In some aspects, the techniques described herein relate to a system, wherein a power supply interface is configured to inductively couple to a power supply interface of the second data connector.

In some aspects, the techniques described herein relate to a system, wherein power lines are connected by a cable to supply power to a power supply interface of the first data connector.

In some aspects, the techniques described herein relate to a system, wherein each adjacent radiofrequency antenna element is connected to a transceiver.

In some aspects, the techniques described herein relate to a system method, wherein subchannel signals of the data into an aggregated channel are configured to be merged by a subchannel signal aggregator.

In some aspects, the techniques described herein relate to a system, wherein radiation emitted from one of the adjacent radiofrequency antenna elements is polarized differently compared to radiation emitted from an adjacent one of the adjacent radiofrequency antenna elements.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A first data connector for communicating a data signal with a second data connector, the first data connector comprising:

a data communication interface including adjacent radiofrequency antenna elements, wherein a plurality of the adjacent radiofrequency antenna elements forms a radiofrequency data antenna array and another radiofrequency antenna element of the adjacent radiofrequency antenna elements forms a radiofrequency control channel antenna element, the data signal being split at the first data connector into subchannel signals, each radiofrequency antenna element of the radiofrequency data antenna array being configured to communicate bidirectionally a subchannel signal of the subchannel signals to a corresponding radiofrequency data antenna element of a data communication interface of the second data connector, each subchannel signal of the subchannel signals including a different portion of the data signal, wherein the subchannel signals are mergeable into the data signal at the second data connector, the radiofrequency control channel antenna element being configured to manage data communications through the radiofrequency data antenna array; and an attachment interface positioned on the first data connector and configured to removably attach the first data connector to the second data connector from a physically unattached configuration to a physically attached configuration, wherein, in the physically attached configuration, each radiofrequency data antenna element of the data communication interface of the first data connector is configured to physically align with a corresponding radio data antenna element of the data communication interface of the second data connector to which the radiofrequency data antenna element communicates its subchannel signal bidirectionally.

2. The first data connector of claim 1, wherein the first data connector is electrically connected as a port within a computing device and the adjacent radiofrequency antenna elements of the first data connector radiate radiofrequency signals that are within a radiofrequency bandwidth substantially outside of radiofrequency bandwidths of other radiofrequency antenna elements in the computing device.

3. The first data connector of claim 1, wherein the first data connector is configured to be removably attachable to the second data connector, wherein the second data connector is electrically connected as a port within a computing device.

4. The first data connector of claim 1, further comprising:
a cable including data lines configured to communicate the data signal to and from the first data connector.

5. The first data connector of claim 1, further comprising:
a power supply interface configured to electrically connect to a power supply interface of the second data connector.

6. The first data connector of claim 1, further comprising:
a power supply interface configured to inductively couple to a power supply interface of the second data connector.

7. The first data connector of claim 1, further comprising:
a cable including power lines configured to supply power to the first data connector.

8. The first data connector of claim 1, further comprising:
transceivers, each transceiver being coupled to one of the adjacent radiofrequency antenna elements.

9. The first data connector of claim 1, further comprising:
a subchannel signal aggregator configured to merge the subchannel signals of the data signal into an aggregated channel.

10. The first data connector of claim 1, wherein radiation emitted from one of the adjacent radiofrequency antenna elements is polarized differently compared to radiation emitted from an adjacent one of the adjacent radiofrequency antenna elements.

11. The first data connector of claim 1, wherein the first data connector and the second data connector connect via a magnetic connection.

12. The first data connector of claim 1, wherein the subchannel signals are multiplexed from the data signal and wherein the data signal is demultiplexable from the subchannel signals at the second data connector.

13. The first data connector of claim 1, the radiofrequency control channel antenna element being configured to communicate bidirectionally over a control channel with a corresponding radiofrequency control channel antenna of the data communication interface of the second data connector.

14. The first data connector of claim 1, the radiofrequency control channel antenna element being configured to manage data communications through the radiofrequency data antenna array and being configured to communicate bidirectionally over a control channel with a corresponding radiofrequency control channel antenna of the data communication interface of the second data connector.

15. A method of communicating a data signal between a first data connector and a second data connector, the method comprising:
removably attaching an attachment interface positioned at the first data connector to the second data connector from a physically unattached configuration to a physically attached configuration, and aligning a data communication interface of the first data connector to face a data communication interface of the second data connector; and
communicating the data signal between the data communication interface of the first data connector and the data communication interface of the second data connector, wherein the data communication interface of the first data connector includes adjacent radiofrequency antenna elements, wherein a plurality of the adjacent radiofrequency antenna elements forms a radiofrequency data antenna array, the data signal being split at the first data connector into subchannel signals, each radiofrequency antenna element of the radiofrequency data antenna array being configured to communicate bidirectionally a subchannel signal of the subchannel signals to a corresponding radiofrequency data antenna element of the data communication interface of the second data connector, each subchannel signal of the subchannel signals including a different portion of the data signal, wherein the subchannel signals are mergeable into the data signal at the second data connector, wherein, in the physically attached configuration, each radiofrequency data antenna element of the data communication interface of the first data connector is configured to physically align with a corresponding radio data antenna element of the data communication interface of the second data connector to which the radiofrequency data antenna element communicates its subchannel signal bidirectionally.

16. The method of claim 15, wherein the first data connector is electrically connected as a port within a computing device and the adjacent radiofrequency antenna elements of the first data connector radiate radiofrequency signals that are within a radiofrequency bandwidth substantially outside of radiofrequency bandwidths of second radiofrequency antenna elements in the computing device.

17. The method of claim 15, wherein the first data connector is configured to be attachable to the second data connector, wherein the second data connector is electrically connected as a port within a computing device.

18. The method of claim 15, wherein data lines are connected by a cable and configured to communicate the data signal to and from the first data connector.

19. The method of claim 15, wherein a power supply interface is configured to electrically connect to a power supply interface of the second data connector.

20. The method of claim 15, wherein a power supply interface is configured to inductively couple to a power supply interface of the second data connector.

21. The method of claim 15, wherein power lines are connected by a cable to supply power to a power supply interface of the first data connector.

22. The method of claim 15, wherein each adjacent radiofrequency antenna element is connected to a transceiver.

23. The method of claim 15, wherein the subchannel signals of the data signal are configured to be merged by a subchannel signal aggregator into an aggregated channel.

24. The method of claim 15, wherein radiation emitted from one of the adjacent radiofrequency antenna elements is polarized differently compared to radiation emitted from an adjacent one of the adjacent radiofrequency antenna elements.

* * * * *